(12) United States Patent
Cook

(10) Patent No.: US 9,166,686 B2
(45) Date of Patent: Oct. 20, 2015

(54) MULTIPLE ACCESS POINT LASER COMMUNICATIONS TERMINAL

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 89 days.

(21) Appl. No.: 13/764,989

(22) Filed: Feb. 12, 2013

(65) Prior Publication Data
US 2014/0226968 A1 Aug. 14, 2014

(51) Int. Cl.
*H04B 10/118* (2013.01)
*H04B 10/112* (2013.01)

(52) U.S. Cl.
CPC .......... *H04B 10/118* (2013.01); *H04B 10/1127* (2013.01)

(58) Field of Classification Search
CPC ............. H04B 10/1125; H04B 10/118; H04B 10/112; H04B 10/1123; H04B 10/40; H04B 10/1129; H04B 10/1127
USPC .......... 398/125, 128–129, 118, 119, 121, 122, 398/123; 359/125, 128, 129
See application file for complete search history.

(56) References Cited

U.S. PATENT DOCUMENTS

| | | | | |
|---|---|---|---|---|
| 5,309,276 A * | 5/1994 | Rodgers | | 359/366 |
| 5,777,768 A * | 7/1998 | Korevaar | | 398/129 |
| 6,252,719 B1 * | 6/2001 | Eichenbaum | | 359/634 |
| 6,347,001 B1 * | 2/2002 | Arnold et al. | | 398/122 |
| 6,970,286 B1 * | 11/2005 | Kunick | | 359/366 |
| 7,277,641 B1 * | 10/2007 | Gleckman | | 398/128 |
| 7,668,468 B1 * | 2/2010 | Lewis et al. | | 398/205 |
| 7,843,650 B1 * | 11/2010 | Roberts | | 359/744 |
| 7,920,794 B1 * | 4/2011 | Whaley et al. | | 398/131 |
| 8,154,712 B2 * | 4/2012 | Kunick | | 356/5.01 |
| 8,208,203 B1 * | 6/2012 | Ramsey et al. | | 359/399 |
| 8,412,050 B2 * | 4/2013 | Nykolak | | 398/130 |
| 2004/0001720 A1 * | 1/2004 | Krill et al. | | 398/125 |
| 2004/0258415 A1 * | 12/2004 | Boone et al. | | 398/125 |
| 2005/0025483 A1 * | 2/2005 | Gurevich et al. | | 398/68 |
| 2006/0056851 A1 | 3/2006 | Takahashi | | |
| 2007/0031150 A1 * | 2/2007 | Fisher et al. | | 398/128 |
| 2007/0031151 A1 * | 2/2007 | Cunningham et al. | | 398/131 |
| 2009/0028573 A1 * | 1/2009 | Krill et al. | | 398/125 |
| 2012/0002973 A1 | 1/2012 | Bruzzi et al. | | |

OTHER PUBLICATIONS

Hindman, Charles et al., "Optimal GEO Lasercomm Terminal Field of View for LEO Link Support", Proceedings of SPIE, vol. 6105, 2006.
Walther, Frederick G. et al., "Air-to-Ground Lasercom System Demonstration Design Overview and Results Summary", Proceedings of SPIE, vol. 7814, Feb. 11, 2011.
Peng Deng et al., "Off-Axis Catadioptric Fisheye Wide Field-of-View Optical Receiver for Free Space Optical Communications," Optical Engineering, vol. 51, No. 5, Jun. 6, 2012, 12 pages.

\* cited by examiner

*Primary Examiner* — Dalzid Singh
(74) *Attorney, Agent, or Firm* — Lando & Anastasi, LLP

(57) ABSTRACT

A laser communications terminal configured for simultaneous two-way stabilized communications links to multiple ground sites. One example of such a laser communications terminal includes a plurality of laser channels, each including a channel transceiver configured to transmit and receive an optical signal, an afocal telescope optically coupled to each of the channel transceivers, a coelostat mirror pair optically coupled to the afocal telescope, and a plurality of beam steering mirrors, at least one beam steering mirror associated with each channel of the plurality of laser channels and configured to independently steer the corresponding optical signal within a field of view of the afocal telescope.

13 Claims, 3 Drawing Sheets

MULTIPLE ACCESS POINT LASER COMMUNICATIONS TERMINAL

BACKGROUND

For space-to-ground communications using a laser, weather conditions have long been a major issue. Laser communications are desirable since a laser channel may have far greater bandwidth, and therefore allow far greater data rates, than radio frequency (RF) channels. Conventionally, weather mitigation often involves switching from laser-based communications to RF-based techniques, with an attendant loss in throughput. Alternatively, weather-related problems may be addressed by using multiple laser communications terminals, each configured to access a single site since the terminals conventionally have a very small field of view (e.g., only a few microradians), or by attempting to move the terminal to another location to avoid the weather. However, each of these solutions has associated costs and SWAP (size, weight and power) penalties. In addition, moving the terminal may result in unavoidable down-time in the communications system while the terminal is being moved.

SUMMARY OF INVENTION

Aspects and embodiments are directed to an advanced laser communications terminal capable of supporting multiple independent channels which can be independently steered over a relatively wide field of view.

According to one embodiment, a laser communications terminal comprises a plurality of laser channels, each including a channel transceiver configured to transmit and receive an optical signal, an afocal telescope optically coupled to each of the channel transceivers, a coelostat mirror pair optically coupled to the afocal telescope, and a plurality of beam steering mirrors, at least one beam steering mirror associated with each channel of the plurality of laser channels and configured to independently steer the corresponding optical signal within a field of view of the afocal telescope.

The laser communications terminal may be mounted on a platform including a gimbal. In one example the coelostat mirror pair is mounted on the gimbal, and the plurality of channel transceivers and the plurality of beam steering mirrors are mounted on a body of the platform and not on the gimbal. In one example the afocal telescope is mounted on the body of the platform and not on the gimbal. The afocal telescope may include a three mirror anastigmat. In another example the afocal telescope is mounted on the gimbal. The afocal telescope may include a primary powered mirror, a secondary powered mirror configured to receive the optical signals from the primary mirror and to reflect the optical signals, a quaternary mirror configured to receive the optical signals reflected from the secondary mirror and to further reflect the optical signals, and a tertiary powered mirror configured to receive the optical signals reflected from the quaternary mirror and to direct the optical signals to the coelostat mirror pair. In one example the quaternary mirror is a substantially flat mirror. The plurality of beam steering mirrors may include a pair of beam steering mirrors associated with each channel of the plurality of laser channels, the pair of beam steering mirrors configured to steer the corresponding optical signal over two dimensions within the field of view of the afocal telescope. In one example the field of view of the afocal telescope is between approximately 1 degree and approximately 2 degrees.

According to another embodiment, a method of providing laser communications comprises producing a plurality of optical signals each corresponding to a laser communications channel, each laser communications channel associated with a ground-based site, transmitting the plurality of optical signals with an afocal telescope, and independently steering each optical signal within a field of view of the afocal telescope to direct each optical signal to the associated ground-based site.

In one example of the method independently steering each optical signal includes independently steering each optical signal with a respective beam steering mirror separate from the afocal telescope. In another example transmitting the plurality of optical signals with the afocal telescope includes directing the plurality of optical signals from the afocal telescope to a coelostat mirror pair, and the method may further comprise directing the plurality of optical signals from the coelostat mirror pair to the respective associated ground-based sites. In another example independently steering each optical signal includes independently steering each optical signal with a respective pair of beam steering mirrors separate from the afocal telescope. The method may further comprise, for each laser communications channel, monitoring a beacon signal transmitted by the associated ground-based site, wherein independently steering each optical signal includes steering each optical based on reception of the beacon signal from the associated ground-based site. In one example the method further comprises selecting an alternate ground-based site responsive to lack of reception of the beacon signal from the associated ground-based site, and steering the optical signal corresponding to the laser communications channel associated with the associated ground-based site to direct the optical signal to the alternate ground-based site.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
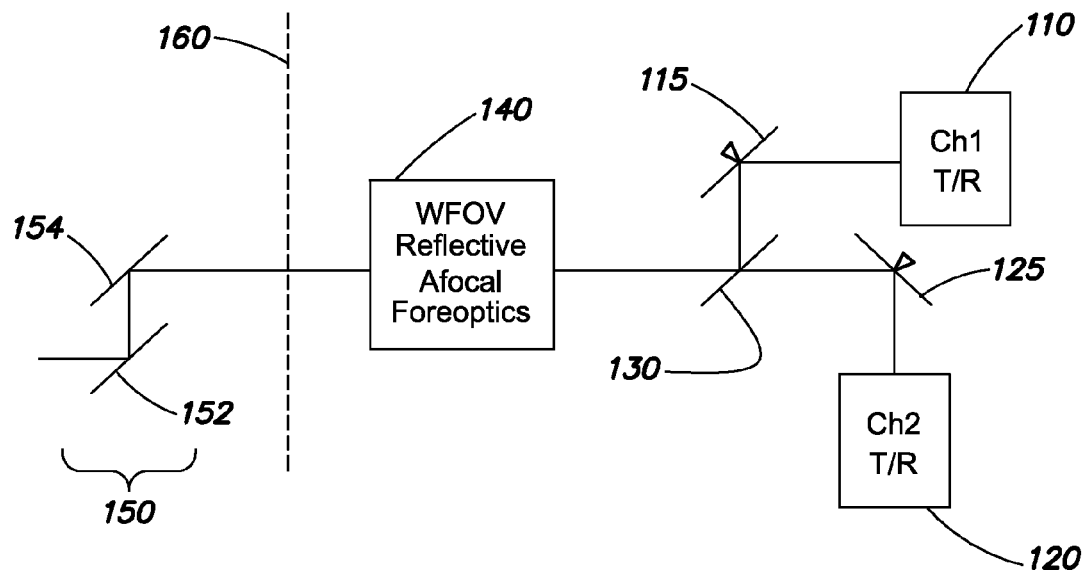
FIG. 1 is a block diagram of one example of a laser communications terminal according to aspects of the invention.

Aspects and embodiments are directed to a laser communications (LC) terminal with the ability to simultaneously access multiple sites and provide advanced capability over conventional LC terminals that have very limited fields of view and the capability to access only a single site at any given time. As discussed above, weather phenomena can be a significant issue in the context of space-to-ground laser communications. However, most weather patterns are moderately localized. Statistically, the greater the ground separation between sites, the greater the likelihood that bad weather in one site will not correlate to similarly bad weather at an alternative site. Therefore, aspects and embodiments are directed to a laser communications terminal which can provide simultaneous two-way stabilized communications links to multiple ground sites separated on the ground by large distances, for example, hundreds of kilometers. These ground sites may be linked together, for example, using optical fiber or other high-bandwidth cables. Accordingly, if access to one site is disrupted due to weather, communication may still be established with another site, and optionally transmitted to the first site via cables. In this manner, the effect of localized weather on communications may be mitigated.

As discussed in more detail below, according to certain embodiments, the LC terminal accommodates multiple independent and individually steerable channels within a relatively wide field of view associated with foreoptics of the terminal. Each channel may be associated with a different ground-based site. Accordingly, without repositioning the terminal within the overall field of regard (FOR), aspects and embodiments allow rapid access to the best ground site within the terminal's field of view (FOV), thereby allowing for weather mitigation. In addition, as discussed further below, certain embodiments are configured to provide a wide field of view with as little moving mass as possible in the system, and optionally maintaining all or most complex mechanical, thermal, and electrical devices "off-gimbal."

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to certain embodiments, a spaced-based laser communications (LC) terminal is configured to be mounted on a vehicle or spacecraft (such as a satellite, for example). The vehicle includes a movable, generally rotatable platform referred to herein as a gimbal, on which at least some of the optical components of the LC terminal are located. Rotation of the gimbal, and therefore the gimbaled components, provides a wide field of regard (WFOR), for example, about 20-40°, which from a spaced-based platform is sufficient to provide coverage over a very large area on the ground. In addition, the LC terminal is configured with an internal wide field of view (WFOV) of approximately 1-2°. Accordingly, the LC terminal may include a WFOR pointing device and a WFOV afocal telescope, as discussed further below. The LC terminal may be configured to accommodate two or more independent channels, and may therefore be configured to implement any of numerous well known channel splitting techniques. The LC terminal may include beam-steering devices to steer each of the channels within the field of view of the system, as discussed further below, and may further include various collimation and imaging components to perform the transmit and receive functions associated with two-way communications, as will be appreciated and understood by those skilled in the art, given the benefit of this disclosure.

Referring to FIG. 1 there is illustrated a functional block diagram of one example of an LC terminal according to certain aspects and embodiments. In this example, the LC terminal includes two independent channels, and therefore includes first and second transceivers 110, 120 respectively associated with first and second channels (referred to herein as channel 1 and channel 2). A beam splitter 130 (or other channel splitting apparatus) is used to separate the two channels. A focal foreoptics 140 is positioned in a common optical path for all channels, and provides the field of view for the LC terminal. As discussed above, in one example the field of view is approximately 1-2°, which even from a low earth orbit satellite may cover a large area on the ground, for example, spanning several hundred kilometers. The afocal foreoptics 140 directs the optical beams for each channel to and from a coelostat mirror pair 150. In one example, the coelostat mirror pair includes a first mirror 152 and a second mirror 154 optically coupled together.

In the example illustrated in FIG. 1, the components positioned to the left of line 160 are mounted "on gimbal," and components to the right of line 160 are mounted "off gimbal" (e.g., on a body of the vehicle on which the LC terminal is located). Thus, in the example illustrated in FIG. 1, the coelostat mirror pair 150 is located in object space relative to the afocal foreoptics 140, and the afocal foreoptics is off gimbal. According to one embodiment, the LC terminal further includes a beam-steering mirror for each channel, namely a first beam-steering mirror 115 associated with channel 1 and a second beam-steering mirror 125 associated with channel 2. The beam-steering mirrors 115, 125 may be used for pointing the optical beams associated with the respective channel within the field of view of the afocal foreoptics, as well as for beam stabilization. Using the beam-steering mirrors 115, 125, each channel may be accurately pointed at its associated ground site within the field of view of the afocal foreoptics 140. In certain examples the use of beam-steering mirrors 115, 125 may be advantageous in that it allows pointing of the optical beams by moving only a small mirror, rather than components with more mass, and may therefore be efficient in terms of power requirements as well as enabling more accurate pointing.

Figure 2:
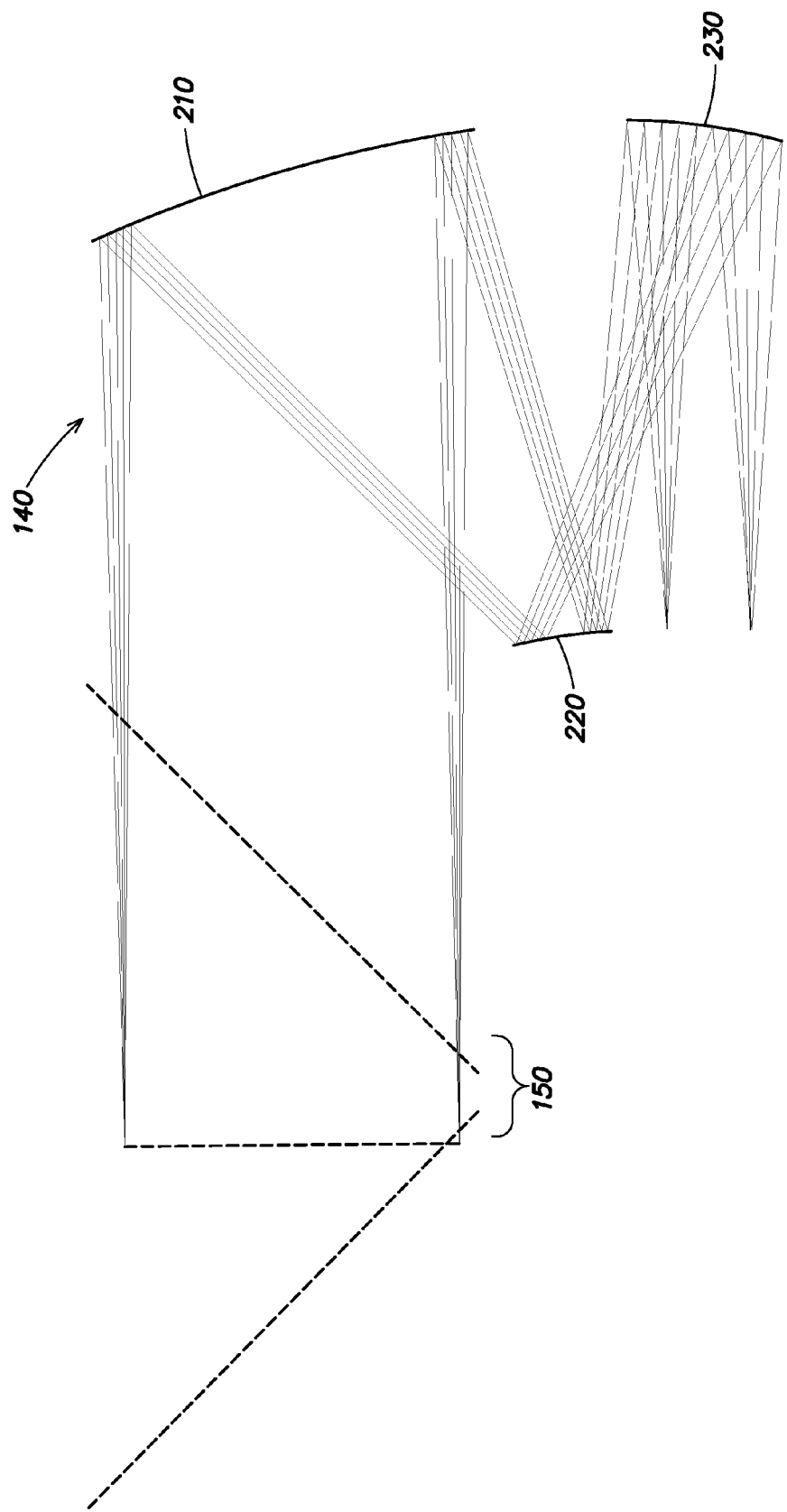
FIG. 2 is a ray trace corresponding to a portion of the laser communications terminal of FIG. 1 according to aspects of the invention.

FIG. 2 is a ray trace of one example of WFOV afocal foreoptics 140 which may be used in the LC terminal of FIG. 1, also showing the positioning of the coelostat mirror pair 150 in object space. In the illustrated example, the afocal foreoptics 140 is a three mirror anastigmat (TMA) including a primary mirror 210, a secondary mirror 220, and a tertiary mirror 230. In one example, the afocal foreoptics 140 with the TMA form illustrated in FIG. 2 has a 2° field of view and 4× magnification.

The LC terminal discussed above with reference to FIGS. 1 and 2 is capable of providing multiple independently steerable channels within the field of view of the afocal foreoptics 140. In addition, the field of view of the afocal foreoptics 140 may be scanned over a broader field of regard of the terminal by rotating the on gimbal coelostat mirror pair 150. This configuration allows the terminal to access multiple ground-based sites simultaneously since each channel may be associated with and pointed towards a particular site. As discussed above, multiple ground-based sites that are spaced relatively far apart from one another may be encompassed within a 1-2° field of view of the LC terminal. Additionally, by moving the field of view within the field of regard, alternate sites may be accessed.

Figure 3:
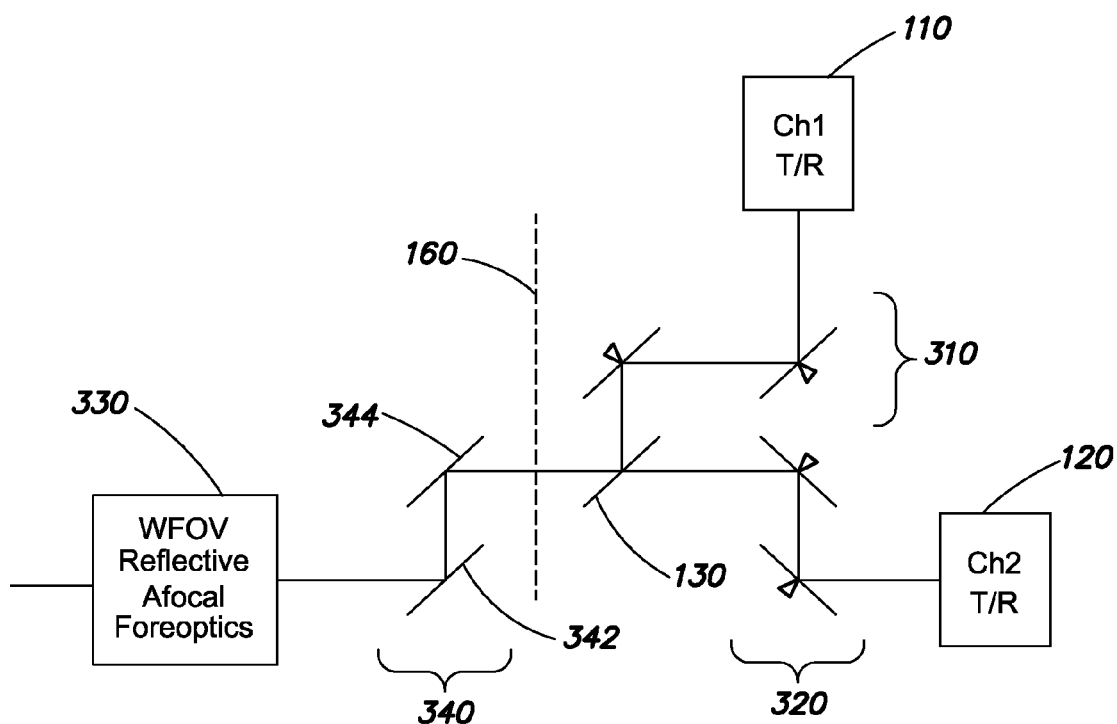
FIG. 3 is a block diagram of another example of a laser communications terminal according to aspects of the invention.

In the above-discussed examples, the afocal foreoptics 140 is located off gimbal. In other embodiments the LC terminal may include afocal foreoptics that are located on gimbal. Referring to FIG. 3 there is illustrated a functional block diagram of one example of an LC terminal including an internal coelostat mirror pair 340 and on gimbal afocal foreoptics 330. Similar to the example discussed above with respect to FIG. 1, the coelostat mirror pair 340 may include a first mirror 342 and a second mirror 344 optically coupled together. Each channel may include a beam-steering mirror pair 310, 320. In this example in which the afocal foreoptics 330 are located on gimbal, a beam-steering mirror pair, rather than a single beam-steering mirror, may be needed to steer the optical beams over two dimensions (e.g., azimuth and elevation) within the field of view of the afocal foreoptics 330. As discussed above, the beam-steering mirror pairs 310, 320 may be used to point the optical beams of each channel toward its associated ground site, and may also be used for beam stabilization.

Figure 4:
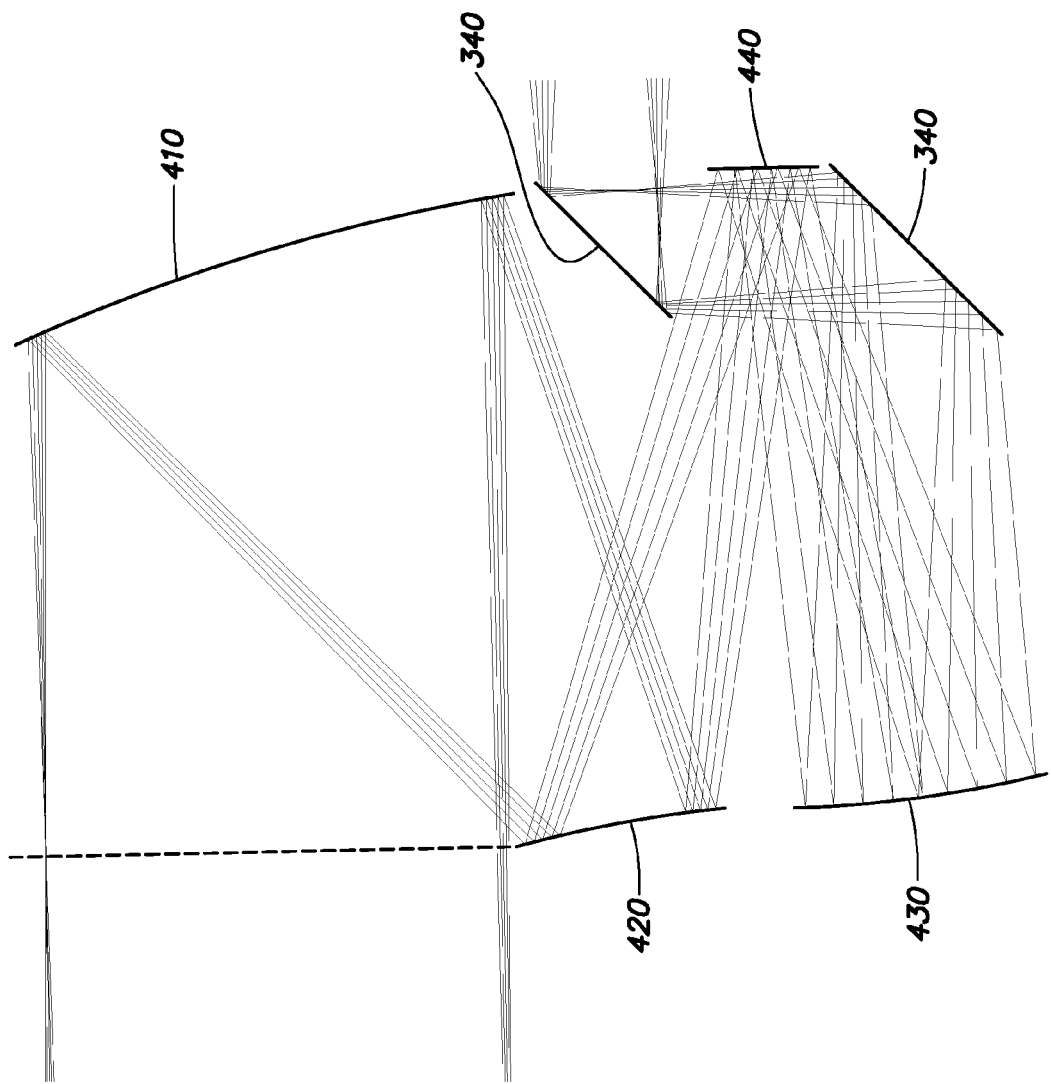
FIG. 4 is a ray trace corresponding to a portion of the laser communications terminal of FIG. 3 according to aspects of the invention.

FIG. 4 is a ray trace of one example of a WFOV afocal foreoptics 330 configuration including an internal coelostat mirror pair 340 which may be used in embodiments of the LC terminal of FIG. 3. In the illustrated example, the WFOV afocal foreoptics 330 includes three powered mirrors, namely a primary mirror 410, a secondary mirror 420, and a tertiary mirror 430. The WFOV afocal foreoptics 330 further includes a quaternary mirror 440 optically positioned between the secondary mirror 420 and the tertiary mirror 430, as shown in FIG. 4. In one example, the quaternary mirror 440 is a substantially flat. Thus, in this configuration, the WFOV afocal foreoptics 330 includes an optical form similar to the three mirror anastigmat shown in FIG. 2, but further including the quaternary mirror 440. In one example, the WFOV afocal foreoptics 330 has a 2° field of view and 4× magnification. Table 1 below provides one example of an optical prescription for an embodiment of the WFOV afocal foreoptics 330 configuration of FIG. 4. The optical prescription for this example system may be generated using an equation which is an industry standard and which would be known to those skilled in the art. It is to be appreciated however, that the prescription given in Table 1 is merely exemplary, and that the prescriptions of various embodiments of the WFOV afocal foreoptics are determined by the intended task(s) to be performed by the system. The units in Table 1 are in centimeters.

TABLE 1

| Surf. | Element | Rd. | C.C. | Thk. | Matl. | YDec. | Ytilt |
|---|---|---|---|---|---|---|---|
| 1 | Ent. Pupil | inf. | | 14.500 | Air | 11.308 | |
| 2 | Primary | −39.911 | −1.000 | −13.764 | Refl | | |
| 3 | Secondary | −20.787 | −5.5717 | 13.799 | Refl | | |
| 4 | Fold | inf. | | −13.855 | Refl | | |
| 5 | Tertiary | 24.680 | −1.000 | 12.171 | Refl | | |
| 6 | Fold | inf. | | −6.750 | Refl | −2.829 | −45.00 |

TABLE 1-continued

| Surf. | Element | Rd. | C.C. | Thk. | Matl. | YDec. | Ytilt |
|---|---|---|---|---|---|---|---|
| 7 | Fold | inf. | | −0.317 | Refl | | 45.00 |
| 8 | Ext. Pupil | inf. | | 4.000 | Air | | |

10 cm Ent. Pupil Diameter
2.5 cm Ext. Pupil Diameter
4X Afocal Magnification
2 deg. FOV Object Space
8 deg. FOV image Space In Table 1, the column designated Rd is the radius of the surfaces, and the minus sign indicates that the center of curvature is to the left of the surface. The column designated CC is the conic constant which is equal to the negative squared value of the eccentricity of a conic section (a planar cut through a double sheeted conic surface). The column designated "Thk" is the thickness of the surface. The column designated "Matl" is the material of the element (Refl meaning "reflective"). With respect to an xyz coordinate system, consider the optical axis as the z-axis, with the y-axis taken in the tangential plane and the x-axis taken in the sagittal plane. The column designated YDec is the decentering distance. The decentering is measured in units of linear measurement along the y axis, and represents a displacement of the vertex of the surface from the origin of the coordinate system. The column designated Ytilt describes the tilt. Each of the mirror surfaces may be formed as a surface of revolution, this being done by revolving a conic section about an axis. The Ytilt column gives the tilt of this axis in the yz plane. A positive number of degrees of tilt represents a tilting in the counterclockwise direction with reference to the xyz coordinate system.

Thus, aspects and embodiments provide an advanced LC terminal that is capable of simultaneously accessing multiple widely separated ground-based sites to mitigate weather conditions and provide enhanced communications ability. Since each LC terminal is capable of accessing multiple sites, the total number of LC terminals needed to provide robust coverage over a large geographical area may be minimized. By using combinations of the WFOV afocal foreoptics and beam steering mirrors for each channel, while also body mounting (off gimbal) the majority of the electronics and components associated with each channel as discussed above, the amount of hardware that needs to be moved over large angles to provide the desired coverage may be minimized. In addition, the combinations of the WFOV afocal foreoptics and beam steering mirrors allows the multiple channels of the LC terminal to be rapidly and internally pointed and stabilized to any site located within the field of view of the foreoptics. In certain embodiments, the ground sites may be configured to transmit a "beacon" signal in addition to the data being transmitted over the channel associated with each respective site. The beacon signal may be used by the LC terminal keep the correct channel accurately pointed and stabilized to the associated ground site. Furthermore, lack of reception of the beacon signal may indicate to the LC terminal that weather conditions, or some other condition or error, is preventing communication with the associated ground site, such that the LC terminal may establish communication with an alternate site. Conventional data/beacon separation techniques may be implemented, for example, in the channel transceivers 110, 120 to obtain the beacon signals. Thus, aspects and embodiments may provide LC terminals with maximum agility in accessing multiple sites to mitigate weather or other conditions and provide robust communications.

Having described above several aspects of at least one embodiment, it is to be appreciated various alterations, modifications, and improvements will readily occur to those skilled in the art. For example, although the block diagrams illustrated in FIGS. 1 and 3 show LC terminals including two channels, the terminals may be configured with any number of channels, not limited to two, and well known channel splitting techniques may be used to separate the signals for each channel, as will be appreciated by those skilled in the art, given the benefit of this disclosure. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. A laser communications terminal comprising:
    a plurality of laser channels, each including a channel transceiver configured to transmit and receive an optical signal;
    an afocal telescope optically coupled to each of the channel transceivers;
    a coelostat mirror pair optically coupled to the afocal telescope; and
    a plurality of beam steering mirrors, at least one beam steering mirror associated with each channel of the plurality of laser channels and configured to independently steer the corresponding optical signal within a field of view of the afocal telescope.

2. The laser communications terminal of claim 1, wherein the laser communications terminal is mounted on a platform including a gimbal;
    wherein the coelostat mirror pair is mounted on the gimbal; and
    wherein the plurality of channel transceivers and the plurality of beam steering mirrors are mounted on a body of the platform and not on the gimbal.

3. The laser communications terminal of claim 2, wherein the afocal telescope is mounted on the body of the platform and not on the gimbal.

4. The laser communications terminal of claim 3, wherein the afocal telescope includes a three mirror anastigmat.

5. The laser communications terminal of claim 2, wherein the afocal telescope is mounted on the gimbal.

6. The laser communications terminal of claim 5, wherein the afocal telescope includes:
    a primary powered mirror;
    a secondary powered mirror configured to receive the optical signals from the primary mirror and to reflect the optical signals;
    a quaternary mirror configured to receive the optical signals reflected from the secondary mirror and to further reflect the optical signals; and
    a tertiary powered mirror configured to receive the optical signals reflected from the quaternary mirror and to direct the optical signals to the coelostat mirror pair.

7. The laser communications terminal of claim 6, wherein the quaternary mirror is a substantially flat mirror.

8. The laser communications terminal of claim 6, wherein the plurality of beam steering mirrors includes a pair of beam steering mirrors associated with each channel of the plurality of laser channels, the pair of beam steering mirrors configured to steer the corresponding optical signal over two dimensions within the field of view of the afocal telescope.

9. The laser communications terminal of claim 1, wherein the field of view of the afocal telescope is between approximately 1 degree and approximately 2 degrees.

10. A method of providing laser communications comprising:
    producing a plurality of optical signals each corresponding to a laser communications channel, each laser communications channel associated with a ground-based site;
    transmitting the plurality of optical signals with an afocal telescope;
    directing the plurality of optical signals from the afocal telescope to a coelostat mirror pair;
    directing the plurality of optical signals from the coelostat mirror pair to the respective associated ground-based sites; and
    independently steering each optical signal within a field of view of the afocal telescope to direct each optical signal to the associated ground-based site with a respective beam steering mirror separate from the afocal telescope.

11. The method of claim 10, wherein independently steering each optical signal includes independently steering each optical signal with a respective pair of beam steering mirrors separate from the afocal telescope.

12. The method of claim 10, further comprising:
    for each laser communications channel, monitoring a beacon signal transmitted by the associated ground-based site; and
    wherein independently steering each optical signal includes steering each optical signal based on reception of the beacon signal from the associated ground-based site.

13. A method of providing laser communications comprising:
    producing a plurality of optical signals each corresponding to a laser communications channel, each laser communications channel associated with a ground-based site;
    transmitting the plurality of optical signals with an afocal telescope;
    for each laser communications channel, monitoring a beacon signal transmitted by the associated ground-based site;
    independently steering each optical signal within a field of view of the afocal telescope based on reception of the beacon signal from the associated ground-based site to direct each optical signal to the associated ground-based site;
    selecting an alternate ground-based site responsive to lack of reception of the beacon signal from the associated ground-based site; and
    steering the optical signal corresponding to the laser communications channel associated with the associated ground-based site to direct the optical signal to the alternate ground-based site.

* * * * *